United States Patent
Roux et al.

(10) Patent No.: US 7,395,198 B1
(45) Date of Patent: Jul. 1, 2008

(54) TECHNIQUES FOR POWERING AN ELECTRONIC DEVICE WITH SIMULATED BACKUP POWER SUPPLY COMMUNICATIONS

(75) Inventors: Phillip J. Roux, Sutton, MA (US); Kanu D. Patel, North Chelmsford, MA (US)

(73) Assignee: EMC Corporation, Hopkinton, MA (US)

( * ) Notice: Subject to any disclaimer, the term of this patent is extended or adjusted under 35 U.S.C. 154(b) by 518 days.

(21) Appl. No.: 11/094,637

(22) Filed: Mar. 30, 2005

(51) Int. Cl.
*G06G 7/54* (2006.01)
(52) U.S. Cl. ............................................ 703/18
(58) Field of Classification Search ............. 703/18
See application file for complete search history.

(56) References Cited

U.S. PATENT DOCUMENTS

| | | | |
|---|---|---|---|
| 5,958,054 A * | 9/1999 | O'Connor et al. | 713/300 |
| 6,274,949 B1 * | 8/2001 | Lioux et al. | 307/64 |
| 6,411,535 B1 | 6/2002 | Roux | 363/124 |
| 6,601,181 B1 * | 7/2003 | Thomas | 713/340 |
| 6,865,685 B2 * | 3/2005 | Hammond et al. | 713/340 |
| 6,943,463 B2 | 9/2005 | Goerke et al. | 307/66 |
| 6,993,680 B2 * | 1/2006 | Fukumori | 714/14 |
| 7,127,621 B2 * | 10/2006 | Wierzbicki et al. | 713/300 |
| 2004/0027751 A1 * | 2/2004 | Goerke et al. | 361/90 |

OTHER PUBLICATIONS

Anaonymous, apcupsd User's Manual, Mar. 22, 2004, retrieved from the Internet from www.ysn.ru/docs/apc/apcupsd.pdf.*
Riccardo Facchetti, "Monitoring your UPS with apcupsd", Nov. 2000, vol. 2000, Issue 80es, pp. 1-8.*

* cited by examiner

*Primary Examiner*—Paul L Rodriguez
*Assistant Examiner*—Russ Guill
(74) *Attorney, Agent, or Firm*—BainwwoodHuang

(57) ABSTRACT

An electronic system has a powerable device (e.g., one or more storage processors), a power supply assembly adapted to provide power from an external power source to the powerable device, and a data communications cable interconnected between the powerable device and the power supply assembly. The power supply assembly is further adapted to simulate backup power supply responses to the powerable device through the data communications cable in response to backup power supply communications from the powerable device through the data communications cable to imitate correct operation of a backup power supply in-line between the external power source and the power supply assembly. In the absence of such a backup power supply, the simulated backup power supply responses alleviate the need to modify the powerable device from a design that works with an actual backup power supply in-line between an external power source and a power supply assembly.

22 Claims, 4 Drawing Sheets

TECHNIQUES FOR POWERING AN ELECTRONIC DEVICE WITH SIMULATED BACKUP POWER SUPPLY COMMUNICATIONS

BACKGROUND

Some data storage systems utilize a standby power supply (SPS) which interconnects between a power supply of the data storage system and a main power feed, i.e., AC-line power. If the AC-line power from the main power feed becomes unavailable, the SPS provides DC backup power to the data storage system in place of the AC-line power. The SPS typically provides enough DC backup power to enable the data storage system to dump its cache into non-volatile memory and, if the AC-line power does not return within a predefined amount of time, to further perform an orderly shutdown.

FIG. 1 shows a block diagram of conventional data storage equipment 20 which includes a data storage system 22, an SPS assembly 24, two power supply power pathways 26(1), 26(2) (collectively, power supply power pathways 26), and two SPS communications pathways 28(1), 28(2) (collectively, SPS communications pathways 28). The data storage system 22 includes storage processing circuitry 30 (e.g., multiple storage processors which perform data storage operations on behalf of one or more host computers) and two power supplies 32(1), 32(2) (collectively, power supplies 32). The power supplies 32 are shown immediately adjacent the storage processing circuitry 30 to illustrate a configuration in which the power supplies 32 and the storage processing circuitry 30 reside together in a common enclosure.

As shown in FIG. 1, the SPS assembly 24 includes two SPS units 34(1), 34(2) (collectively, SPS units 34). The SPS unit 34(1) connects to a main power feed 36(1), the power supply power pathway 26(1) leading to the power supply 32(1), and the SPS communications pathway 28(1) leading to the storage processing circuitry 30. Similarly, the SPS unit 34(2) connects to a main power feed 36(2), the power supply power pathway 26(2) leading to the power supply 32(2), and the SPS communications pathway 28(2) leading to the storage processing circuitry 30. The power supply power pathways 26 (i.e., power paths) are separate and independent of the SPS communications pathways 28 (i.e., data signal paths).

As further shown in FIG. 1, each SPS unit 34 includes a controller 38, a set of batteries 40, and an ON/OFF switch 42. In particular, the SPS unit 34(1) includes a controller 38(1), a set of batteries 40(1), and an ON/OFF switch 42(1). Likewise, the SPS unit 34(2) includes a controller 38(2), a set of batteries 40(2), and an ON/OFF switch 42(2). The controllers 38 direct the operation of the SPS units 34. The batteries 40 store backup power for use by the data storage system 22 in the event of a loss of the main power feeds 36(1), 36(2) (collectively, main power feeds 36). The switches 42 enable a user to cutoff power completely to the power supplies 32.

When the power supplies 32 receive AC-line power from the SPS units 34, the power supplies 32 output DC power signals having a first polarity to the storage processing circuitry 30. However, if the power supplies 32 receive backup DC power from the SPS units 34, the power supplies 32 output DC power signals having the opposite polarity to the storage processing circuitry 30. The storage processing circuitry 30 is equipped with polarity detectors 44(1), 44(2) thus enabling the storage processing circuitry 30 to distinguish between a normal situation in which the storage processing circuitry 30 is running on AC-line power from the main power feeds 36, and an abnormal situation in which the storage processing circuitry 30 is running on DC backup power from the batteries 40.

During operation of the data storage equipment 20, the controllers 38 of the SPS units 34 normally supply AC-line power to the data storage system 22 directly from the main power feeds 36, and charge the batteries 40 when necessary. In response to the AC-line power, the storage processing circuitry 30 stores data into and retrieves data from an array of disk drives on behalf of one or more external host computers. Additionally, software running on storage processing circuitry 30 (e.g., a master controller) periodically sends SPS queries and SPS commands to the SPS assembly 24 through the SPS communications pathways in order to obtain SPS operating information and guide the operation of the SPS assembly 24 (e.g., a slave controller). In response to the SPS queries, the controllers 38 of the SPS units 34 provide particular SPS responses back to the data storage system 22 through the SPS communications pathways 28 (e.g., an SPS response identifying an operating state in response to an SPS condition query, an SPS response providing results of a battery test in response to an SPS battery test query, etc.). Furthermore, in response to the SPS commands, the controllers 38 perform particular SPS functions (e.g., an SPS command to test the batteries 40, another SPS command to modify operating parameters, etc.).

If main power (i.e., AC-line power) is lost during operation, the controllers 38 disconnect the main power feeds 36 from the power supply power pathways 26, and instead supply backup power (i.e., DC power) from the batteries 40 to the data storage system 22 through the power supply power pathways 26. Upon detection of this event by the detectors 44(1), 44(2) of the storage processing circuitry 30, the storage processing circuitry 30 begins a fault tolerant procedure which involves dumping its cache out to non-volatile memory and shutting down.

If main power returns to normal before the storage processing circuitry 30 reaches a defined shutdown point, the SPS units 34 switch back to supplying main power through the power supply power pathways 26. In response, the storage processing circuitry 30 is capable resuming normal operation (e.g., write-caching operations).

However, if the storage processing circuitry 30 passes the defined shutdown point and main power has not returned, the storage processing circuitry 30 performs an orderly shutdown and commands the SPS units 34 through the SPS communications pathways 28 to shutdown as well. Once shutdown, the SPS units 34 will return to normal operation upon return of main power.

SUMMARY

There are some situations which do not require data storage equipment to include backup power supplies between the data storage system and the main power feed. For example, there are operating environments within the telecom industry in which the main power feed is already backed up by local arrays of batteries thus alleviating the need for an SPS assembly 24 having standby power supplies 34 as shown in FIG. 1. In these operating environments (e.g., a central office), the power sources making up the main power feed are so robust from a fault tolerance perspective that the main power feed is essentially considered to be perfectly reliable.

One approach to adapting the above-described data storage equipment 20 so that it works within an operating environment that does not use an SPS assembly 24 is to re-write the software of the storage processing circuitry 30. In particular, the manufacturer of the data storage equipment can re-write the software routines within the storage processing circuitry 30 so that they no longer send SPS command and SPS queries and expect SPS responses. Furthermore, the manufacturer can further provide a switch on the storage processing circuitry 30 which allows a user to run the storage processing circuitry 30 with the SPS assembly 24 when the switch is in a first position, and run the storage processing circuitry 30 without the SPS assembly 24 when the switch is in the opposite position. Unfortunately, a drawback to this approach is that the manufacturer now has to write additional software, separately test the storage processing circuitry 30 when the switch is in each position, and rely on the user to set the switch in the correct position when once the storage processing circuitry 30 is installed in an operating environment.

In contrast to the above-described approach, improved techniques for powering an electronic device, such as storage processing circuitry configured to communicate with a backup power supply, involve simulating operation of such a backup power supply within a power supply assembly that does not truly have such a backup power supply. Such techniques alleviate the need for a manufacturer to re-write any software of the electronic device (e.g., no modifications or enhancements need to be made to software running in storage processing circuitry which issues SPS commands and SPS queries). Additionally, such techniques alleviate the need for the manufacturer to (i) run dual tests on the electronic device with and without a backup power supply, or (ii) rely on the proper setting of a switch designed to run the device in one of two different modes depending on whether a backup power supply actually exists. Rather, the manufacturer simply provides circuitry which imitates backup power supply responses in lieu of an actual backup power supply.

One embodiment is directed to an electronic system having a powerable device (e.g., one or more storage processors), a power supply assembly adapted to provide power from an external power source to the powerable device, and a data communications cable interconnected between the powerable device and the power supply assembly. The power supply assembly is further adapted to provide simulated backup power supply responses to the powerable device through the data communications cable in response to backup power supply communications from the powerable device through the data communications cable in order to imitate correct operation of a backup power supply in-line between the external power source and the power supply assembly. The ability of the power supply assembly to provide simulated backup power supply responses in the absence of a backup power supply in-line between the external power source and the power supply assembly alleviates the need to modify the powerable device from a design that works with an actual backup power supply in-line between an external power source and a power supply assembly.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Improved techniques for powering an electronic device, such as storage processing circuitry configured to communicate with a backup power supply, involve simulating operation of the backup power supply when the backup power supply is absent and unnecessary. Such techniques alleviate the need for a manufacturer to re-write any software of the electronic device (e.g., no modifications or enhancements need to be made to software running in storage processing circuitry which issues SPS commands and SPS queries). Additionally, such techniques alleviate the need for the manufacturer to (i) extensively test the electronic device both with and without the backup power supply, or (ii) rely on the proper setting of a switch designed to run the device in one of two different modes depending on whether the backup power supply is present. Rather, the manufacturer simply provides a simulator which imitates backup power supply responses in lieu of the actual backup power supply.

Figure 1:
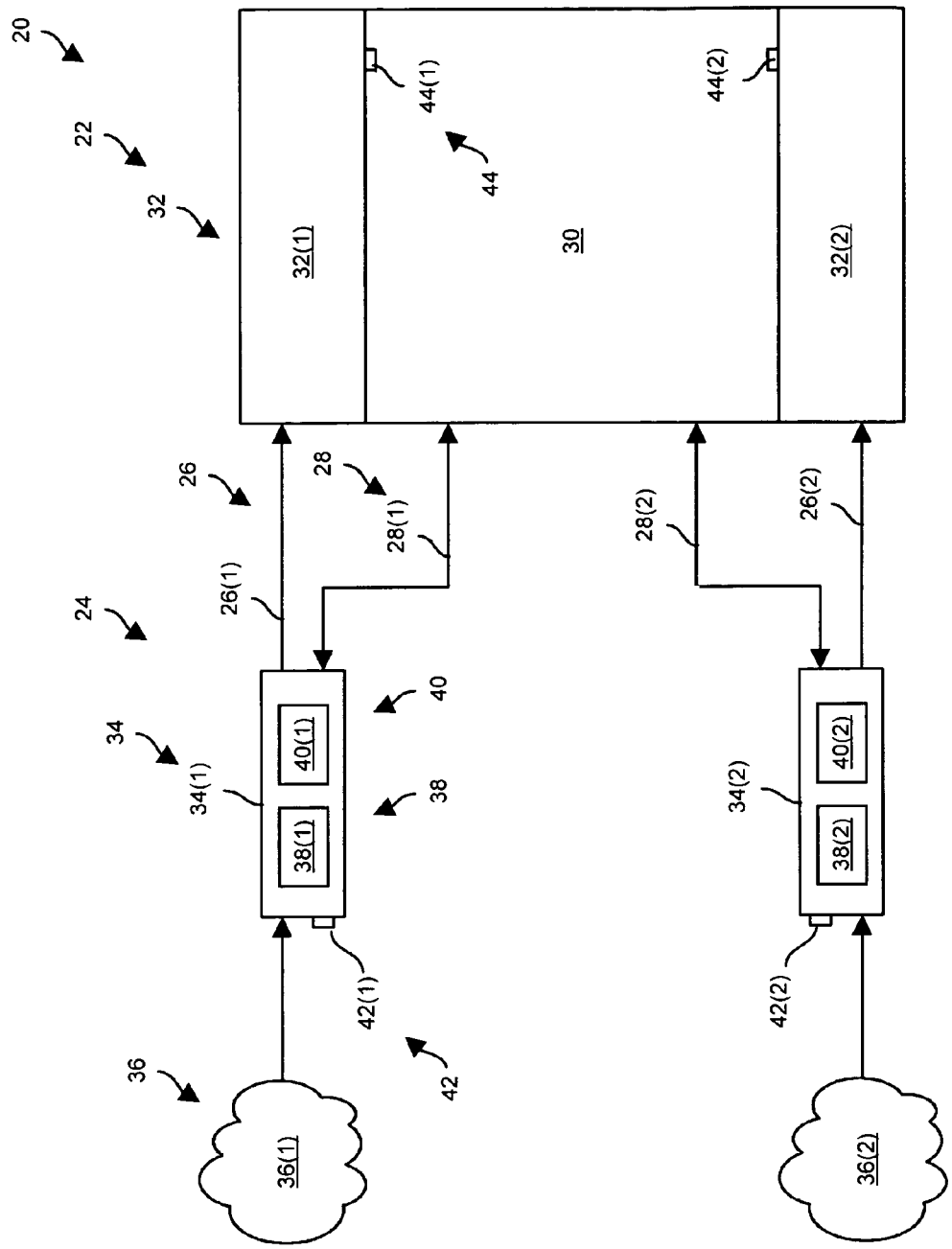
FIG. 1 is a block diagram of conventional data storage equipment having a data storage system and a standby power supply (SPS) assembly.
Figure 2:
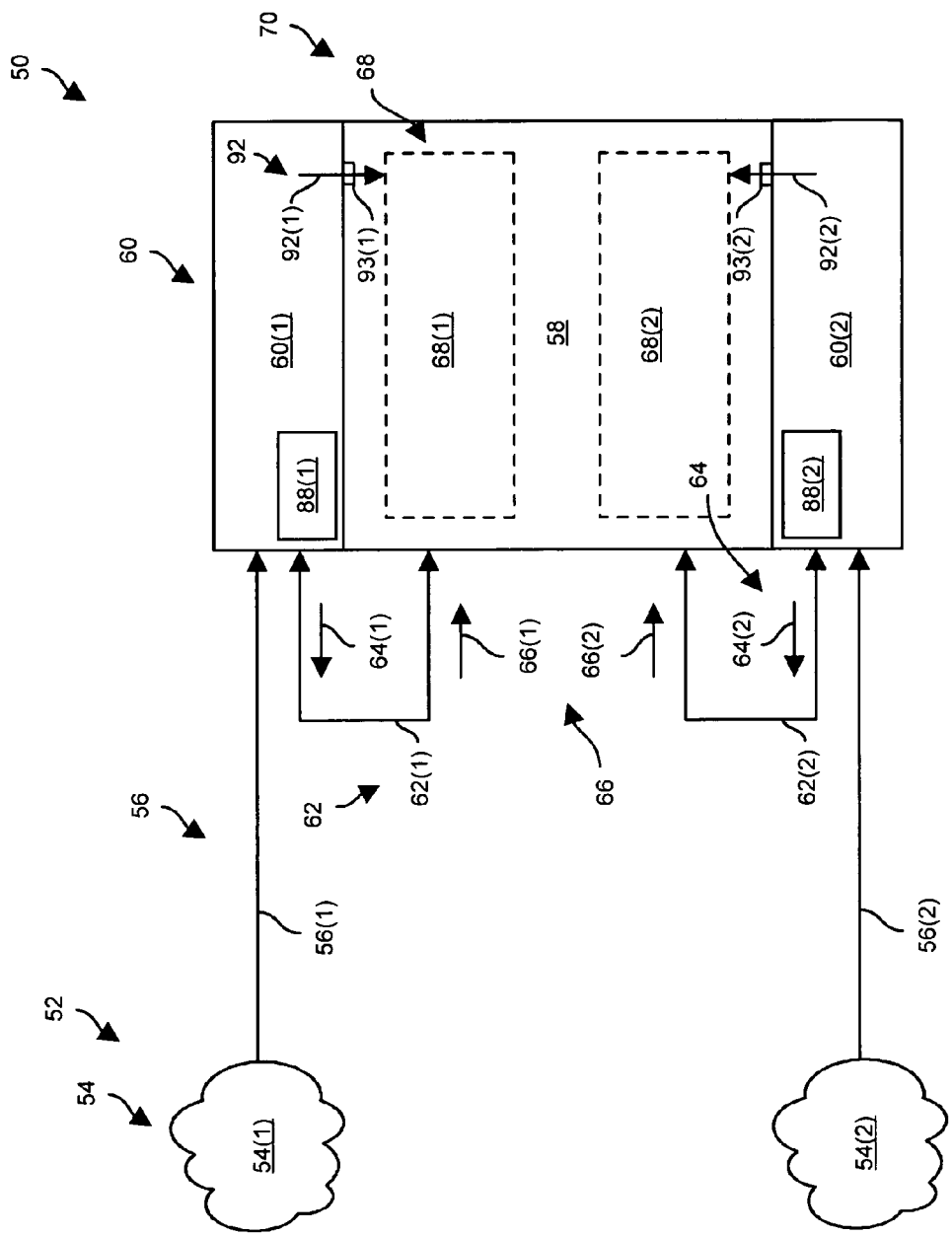
FIG. 2 is a block diagram of an improved electronic system having power supplies configured to simulate operation of a backup power supply assembly.

FIG. 2 shows an electronic system 50 within an environment 52 having main power feeds 54(1), 54(2) (collectively, main power feeds 54) which are backed up by local batteries. As a result, power from the main power feeds 54 can be considered perfectly reliable, and power signals 56(1), 56(2) (collectively, power signals 56) can be considered always available (both hot and return legs for the power signals 56 are represented by the single arrows 56 shown in FIG. 2). Such an environment 52 is capable of existing in a variety of settings such as in a central office location of a telecom company which has access to −48 VDC power supply signals, as the power signals 56. In such settings, the power signals 56 are preferably truly independent of the power grid of the local power distribution utility company.

As shown in FIG. 2, the electronic system 50 includes a powerable device 58, power supply assemblies 60(1), 60(2), and bi-directional data communications cables 62(1), 62(2) (collectively, cables 62). That is, the data communications cable 62(1) interconnects between the power supply assembly 60(1) and the powerable device 58. Similarly, the data communications cable 62(2) interconnects between the power supply assembly 60(2) and the powerable device 58.

The power supply assemblies 60(1), 60(2) (collectively, power supply assemblies 60) are adapted to provide power from the main power feeds 54 to the powerable device 58. The power supply assemblies 60 are further adapted to provide simulated backup power supply responses 64 to the powerable device 58 in response to backup power supply communications 66(1), 66(2) from the powerable device 58 in order to imitate correct operation of a backup power supply in-line between the main power feeds 54 and the power supply assemblies 60. In the absence of such a backup power supply, the simulated backup power supply responses 64 alleviate the need for a manufacturer to modify the powerable device 58 from a design that works with an actual backup power supply (e.g., a standby power supply (SPS)) in-line between an external power source and a power supply assembly.

Specifically, the power supply assembly 60(1) is adapted to provide simulated SPS responses 64(1) to the powerable device 58 through the data communications cable 62(1) in response to SPS communications 66(1) (e.g., SPS commands and SPS queries) from the powerable device 58 through the data communications cable 62(1). Similarly, the power supply assembly 60(2) is adapted to provide simulated SPS responses 64(2) to the powerable device 58 through the data communications cable 62(2) in response to SPS communications 66(2), from the powerable device 58 through the data communications cable 62(2). Along these lines, the power supply assemblies 60(1), 60(2) are capable of substantially simultaneously simulating separate SPS units to the powerable device 58.

During operation of the electronic system 50, the powerable device 58 is capable of performing a variety of operations (e.g., general purpose computing operations, data storage operations, etc.). Preferably, the powerable device 58 includes redundant computing devices 68(1), 68(2) (collectively, computing devices 68) such as redundant storage processors 70 (represented generally by the arrow 70 in FIG. 2) which are configured to perform data storage operations on behalf of one or more external host computers. Along these lines, such storage processors 70 independently store data into and retrieve data from a set of non-volatile storage units (e.g., disk drives). In view of the extremely high reliability of the power signals 56 from the main power feeds 54 as well as the redundant nature of the power supply assemblies 60 and the computing devices 68, the storage processors 70 are capable of withstanding at least one fault (e.g., component failure) before the storage processors 70 risk losing data due to another component failure. Accordingly, during normal operation, the storage processors 70 are capable of employing a variety of optimized caching techniques such as write-back caching on behalf of the host computers. Further details will now be provided with reference to both FIGS. 2 and 3.

Figure 3:
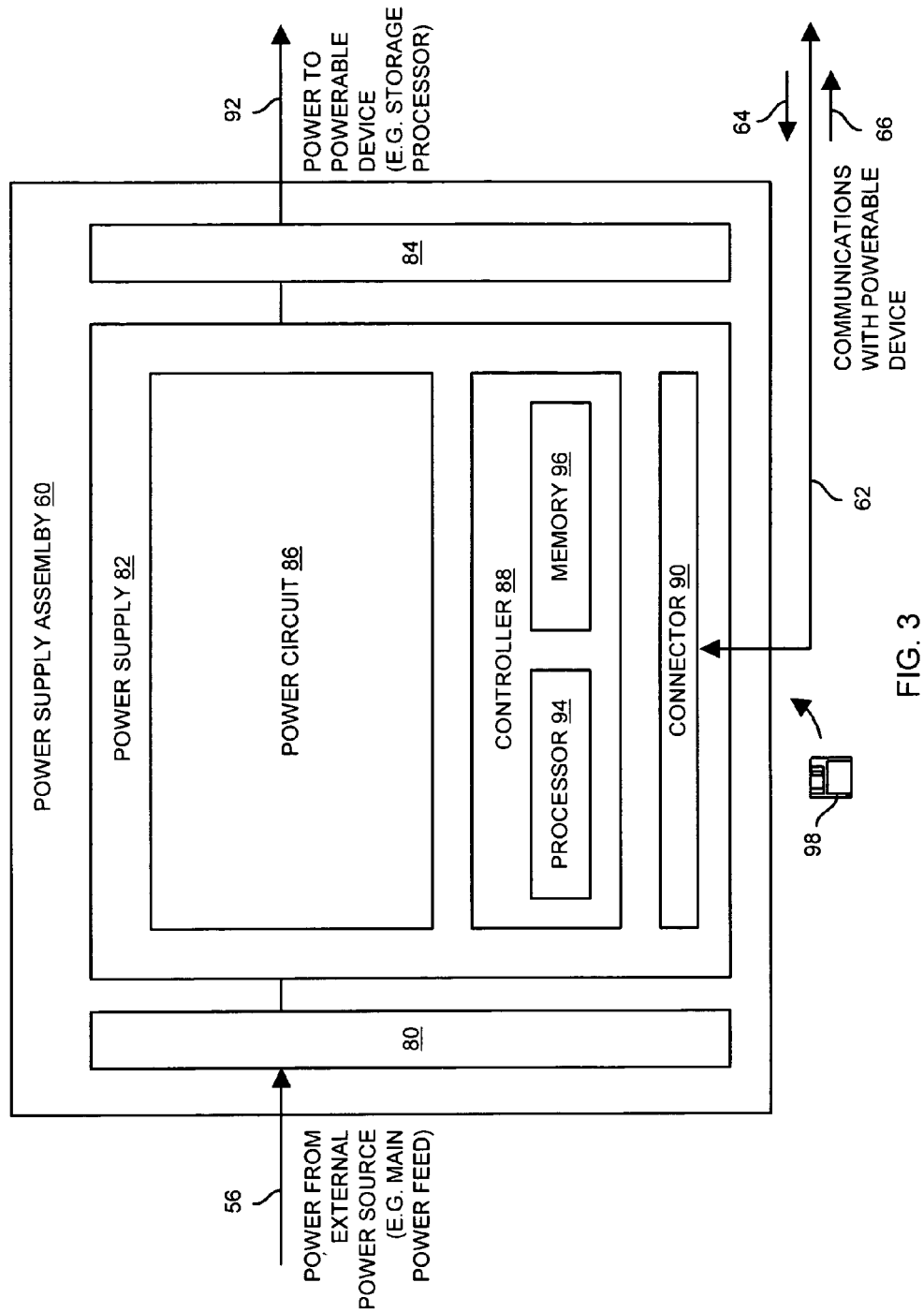
FIG. 3 is a block diagram of a power supply assembly of the improved electronic system of FIG. 2.

FIG. 3 is a detailed view of a power supply assembly 60 of the electronic system 50. Each power supply assembly 60 includes an input 80, a power supply 82, and an output 84. The input 80 is adapted to couple to an external power source (e.g., see the main power feeds 54 in FIG. 2). The output 84 is adapted to couple to a powerable device (e.g., see the computing devices 68 in FIG. 2). The power supply 82 is interconnected between the input 80 and the output 84 in an in-line manner.

The power supply 82 includes a power circuit 86, a controller 88, and a data communications connector 90. The power circuit 86 is adapted to generate a power supply signal 92 (e.g., to convert DC power from the external power source into DC power supply signals 92(1), 92(2) which can be polarity sensed in a standard manner by detectors 93(1), 93(2), see FIG. 2). The controller 88 is coupled to the power circuit 86, and is adapted to control operation of the power circuit 86 (e.g., to enable and disable the power circuit 86). The data communications connector 90 (e.g., an RJ 12 Jack) is coupled to the controller 88 in order to form, in combination with a data communications cable 62 leading from the connector 90 to the powerable device 58, a data communications channel (e.g., RS232 communications) between the controller 88 and the powerable device 58 in the absence of a backup power supply in-line between the external power source and the power supply assembly 60. As shown in FIG. 3, the data communications channel (i.e., a data path) is electrically isolated from the output 84 of the power supply assembly 60 (i.e., a power path).

As will explained in further detail shortly, the controller 88 within the power supply assembly 60 is adapted to perform functions in addition to controlling the power circuit 86. In particular, the controller 88 is further adapted to provide the simulated backup power supply responses 66 (e.g., slave communications) to the powerable device 58 in response to communications from the powerable device 58 (e.g., master communications) which are intended to go to an actual SPS unit in-line between the power supply assembly 60 and a respective main power feed 54. Since there is no SPS unit at that location, the controller 88 imitates such a unit thus enabling the powerable device 58 to continue normal operation and not transition to an error handling operation or otherwise degrade its performance (e.g., transition to a write-through caching mode) in belief that a failure has occurred. To highlight this feature, respective controllers 88(1), 88(2) are illustrated within the power supply assemblies 60(1), 60(2) adjacent the data communications cables 64(1), 64(2) in FIG. 2.

With reference now back to FIG. 3, the controller 88 includes a processor 94 and memory 96 (e.g., flash EPROM). The memory 96 is adapted to store an application (i.e., a set of instructions) which is capable of being delivered to the memory 96 from a computer program product 98. When the processor 94 executes the application, the processor 94 is capable of reproducing communications of an actual backup power supply (e.g., an SPS unit).

Although the computer program product 98 is illustrated as a diskette by way of example only, a variety of communications and storage media are suitable for use (e.g., a set of CD-ROMs, tapes, memory cards or sticks, network downloads, propagated signals, combinations thereof, etc.). In some arrangements, the powerable device 58 delivers the application through the data communications cable 62 and the data communications connector 90 (e.g., the powerable device 58 performs an automated firmware updating process on the power supplies 82). Further details of the how the controller 88 operates will now be provided with reference to FIG. 4.

Figure 4:
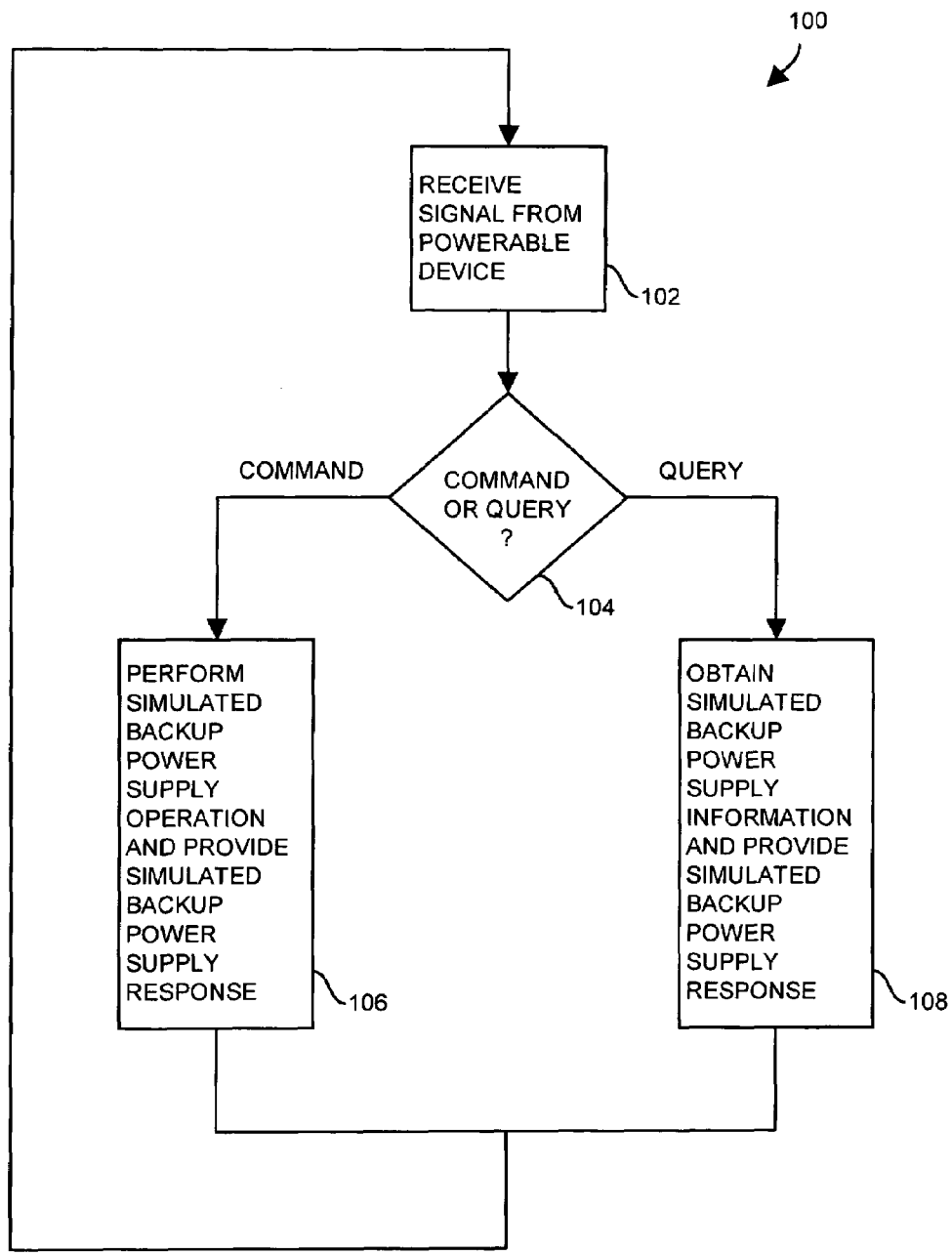
FIG. 4 is a flowchart of a procedure which is performed by the power supply assembly of FIG. 3.

FIG. 4 is a flowchart of a procedure 100 which is performed by the controller 88 of the power supply assembly 60 of FIG. 3. At this point, it should be understood that there are generally two types of communications 66 which are sent from the powerable device 58, namely, SPS commands and SPS queries. An SPS command from the powerable device 58 is intended to direct an actual SPS unit which is in-line between the external power source and the power supply assembly 60 to do something (e.g., perform a battery test, shut itself off, etc.). An SPS query from the powerable device 58 is intended to direct an actual SPS unit which is in-line between the external power source and the power supply assembly 60 to provide information regarding the actual SPS unit back to the powerable device 58. Since there is no actual SPS unit in-line between the external power source and the power supply assembly 60 (i.e., in FIG. 2 see that the main power feeds 54 directly connect to the power supply assemblies 60), the controllers 88 of the power supply assemblies 60 imitate the operation of actual SPS units thus alleviating the need to modify the powerable device 58 if the powerable device 58 runs software which is designed to work in a setting that uses actual SPS units.

In step 102, the controller 88 receives a communications signal 66 from the powerable device 58 through a data communications cable 62 (also see FIG. 2). Such a signal is sent from the powerable device 58 to an SPS unit as the targeted recipient.

In step 104, the controller 88 determines whether the communications signal 66 is an SPS command or an SPS query. If the communications signal 66 is an SPS command, step 104 proceeds to step 106. If the communications signal 66 is not an SPS command, step 104 proceeds to step 108.

In step 106, the controller 88 performs a simulated backup power supply operation and provides a simulated backup power supply response back to the powerable device 58 through the data communications cable 62 (e.g., see the responses 66(1), 66(2) in FIG. 2). Next, step 106 loops back to step 102 to enable the controller 88 to attend to another communications signal 64 (e.g., another SPS command or SPS query).

In step 108, the controller 88 obtains simulated backup power supply information (e.g., by retrieving data from the memory 96 or from a status register of the processor 94) and provides a simulated backup power supply response back to the powerable device 58 through the data communications cable 62 (e.g., packages the retrieved data into the backup power supply response signal 66 and sends that signal 66 to the powerable device 58 through a respective cable 62). Next, step 108 loops back to step 102 to enable the controller 88 to attend to another communications signal 64. In this manner, the controller 88 simulates operation of an actual SPS unit and thus keeps the powerable device 58 operating correctly. The following example will provide further details of how the controller 88 operates when performing the procedure 100.

Suppose that the electronic system 50 has just begun to receive power from the main power feeds 54. Here, the controller 88 directs the power circuit 86 to provide a power supply signal 92 (FIG. 2) to the powerable device 58 within proper voltage levels and timing constraints to ensure proper startup and operation of the circuitry within the powerable device 58. At the same time, the controller 88 imitates correct operation of an SPS unit in order to provide simulated SPS responses in response to any SPS commands or SPS queries from the powerable device 58. Along these lines, the controller 88 initially imitates an SPS unit being in a SELF TEST state for a predefined self test time period (e.g., substantially five seconds). After the self test time period has elapsed, the controller 88 imitates the SPS unit being in a BATTERY CHARGING state for a predefined battery charging time period (e.g., 15 seconds). After the predefined battery charging time period has elapsed, the controller 88 imitates the SPS unit being in a READY state.

If the controller 88 receives, as an SPS communication 64, a CONDITION query from the powerable device 58 through the cable 62 while imitating the SPS unit in the BATTERY CHARGING state, the controller 88 returns, as an SPS response 66, a BATTERY CHARGING reply to the powerable device 58 through the cable 62. Such a response 66 indicates proper operation for an actual SPS unit in-line between the main power feed 54 and the power supply assembly 60 even though such an SPS unit is absent.

Similarly, if the controller 88 receives, as an SPS communication 64, a CONDITION query from the powerable device 58 through the cable 62 while imitating the SPS unit in the READY state, the controller 88 returns, as an SPS response 66, a READY reply to the powerable device 58 through the cable 62. Again, such a response 66 indicates proper operation for an actual SPS unit in-line between the main power feed 54 and the power supply assembly 60 even though such an SPS unit is absent.

In addition to being responsive to SPS queries, it should be understood that the controller 88 is capable of being responsive to SPS commands from the powerable device 58 as well. For example, while the controller 88 imitates an actual SPS unit in the READY state, the controller 88 is adapted to transition to a BATTERY TEST state for a predefined BATTERY TEST amount of time in response to a BATTERY TEST command from the powerable device 58. As a result, if the controller 88 subsequently receives a CONDITION query from the powerable device 58 while still in the BATTERY TEST state, the controller 88 returns, as an SPS response 66, an ON BATTERY reply to the powerable device 58 through the cable 62. Such a response 66 indicates proper operation for an actual SPS unit in-line between the main power feed 54 and the power supply assembly 60 even though such an SPS unit is absent.

As another example, while the controller 88 imitates an actual SPS unit in the READY state, the controller 88 may receive a STOP command. In such a situation, the controller 88 essentially ignores the STOP command and continues to direct the power circuit 86 to provide power to the powerable device 58. Accordingly, the controller 88 correctly imitates the operation of an SPS unit since such an SPS unit would normally transition from AC-line power to battery power and thus continue to power the powerable device 58.

Furthermore, while the controller 88 imitates an actual SPS unit in the ON BATTERY state, the controller 88 may receive a STOP command (e.g., if a user has recently turned a switch on the electronic system 50 from the ON position to the OFF position). In response to this STOP command while the controller is in the ON BATTERY state, the controller 88 powers down and ceases operation of the power supply 82 thus effectively turning off the electronic system 50, i.e., to imitate an SPS unit transitioning from battery power to a completely turned off state.

It should be understood that the controller 88 is adapted to respond to other SPS commands such as commands to modify particular parameters such as battery testing time, identification information, etc. It should be further understood that the controller 88 is adapted to respond to other SPS queries as well such as queries for status, manufacturer information, part numbers, serial numbers, revision levels, parameter settings, and so on.

As mentioned above, an improved electronic system 20 has a powerable device 58 which is configured to communicate with a backup power supply. The electronic system 20 includes a power supply 60 which simulates operation of the backup power supply when the backup power supply is absent and unnecessary. Such operation alleviates the need for a manufacturer to re-write any software of the powerable device 58 (e.g., no modifications or enhancements need to be made to software running in storage processing circuitry which issues SPS commands and SPS queries). Additionally, such operation alleviates the need for the manufacturer to (i) extensively test the powerable device 58 both with and without the backup power supply, or (ii) rely on the proper setting of a switch designed to run the device 58 in one of two different modes depending on whether the backup power supply is present. Rather, the manufacturer simply provides a simulator (i.e., a controller 88) which imitates backup power supply responses in lieu of the actual backup power supply.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An electronic system, comprising:
a powerable device;
a power supply assembly configured to provide power from an external power source to the powerable device; and
a data communications cable interconnected between the powerable device and the power supply assembly, the power supply assembly being further configured to provide simulated backup power supply responses to the powerable device through the data communications cable in response to backup power supply communications from the powerable device through the data communications cable to imitate correct operation of a backup power supply.

2. An electronic system as in claim 1 wherein a power supply of the power supply assembly includes:
   a power circuit configured to generate a power supply signal;
   a controller coupled to the power circuit, the controller being configured to control operation of the power circuit; and
   a data communications connector coupled to the controller and the data communications cable;
   the data communications connector forming, in combination with the data communications cable, a data communications channel between the controller and the powerable device in the absence of a backup power supply in-line between the external power source and the power supply assembly, the data communications channel being electrically isolated from the output of the power supply assembly.

3. An electronic system as in claim 2 wherein the controller of the power supply includes:
   a processor; and
   memory coupled to the processor, wherein the memory is configured to store an application, and wherein the processor is configured to reproduce communications of a backup power supply when executing the application.

4. An electronic system as in claim 2 wherein the controller, when providing simulated backup power supply responses, is configured to:
   initially imitate a backup power supply being in a SELF TEST state, imitate the backup power supply being in a BATTERY CHARGING state after a self test time period has elapsed, and imitate the backup power supply being in a READY state after a battery charging time period has elapsed.

5. An electronic system as in claim 4 wherein the controller, when imitating the backup power supply being in the BATTERY CHARGING state, is configured to:
   provide a simulated BATTERY CHARGING reply to the powerable device through the data communications channel, in response to a backup power supply CONDITION query from the powerable device through the data communications channel, the BATTERY CHARGING reply being a simulated backup power supply response indicating that the imitated backup power supply is in the BATTERY CHARGING state.

6. An electronic system as in claim 4 wherein the controller, when imitating the backup power supply being in the READY state, is configured to:
   provide a simulated READY reply to the powerable device through the data communications channel, in response to a backup power supply CONDITION query from the powerable device through the data communications channel, the READY reply being a simulated backup power supply response indicating that the imitated backup power supply is in the READY state.

7. An electronic system as in claim 4 wherein the controller, when imitating the backup power supply being in the READY state, is configured to:
   imitate the backup power supply transitioning into a BATTERY TEST state in response to a BATTERY TEST command from the powerable device through the data communications channel.

8. An electronic system as in claim 7 wherein the controller, when imitating the backup power supply being in the BATTERY TEST state, is configured to:
   provide an ON BATTERY reply to the powerable device through the data communications channel, in response to a CONDITION query from the powerable device through the data communications channel, the ON BATTERY reply being a simulated backup power supply response indicating that the imitated backup power supply is in the BATTERY TEST state.

9. An electronic system as in claim 4 wherein the controller, when imitating the backup power supply being in the READY state, is configured to:
   receive a STOP command from the powerable device through the data communications channel; and
   ignore the STOP command by continuing to provide power to the powerable device.

10. An electronic system as in claim 4 wherein the controller, when imitating the backup power supply being in an ON BATTERY state, is configured to:
    power down and cease operation of the power supply in response to a STOP command from the powerable device through the data communications channel.

11. An electronic system as in claim 1 wherein the power supply assembly does not have a backup power supply.

12. A power supply assembly, comprising:
    an input configured to couple to an external power source;
    an output configured to couple to a powerable device; and
    a power supply interconnected between the input and the output, the power supply being configured to:
       provide a power supply signal to the powerable device through the output when the input couples to the external power source and the output couples to the powerable device, and
       provide simulated backup power supply responses to the powerable device in response to backup power supply communications from the powerable device to imitate correct operation of a backup power supply.

13. A power supply assembly as in claim 12 wherein the power supply includes:
    a power circuit configured to generate the power supply signal;
    a controller coupled to the power circuit, the controller being configured to control operation of the power circuit; and
    a data communications connector coupled to the controller, the data communications connector being configured to connect to a data communications cable extending from the powerable device to form, in combination with the data communications cable, a data communications channel between the controller and the powerable device in the absence of a backup power supply in-line between the external power source and the input, the data communications channel being electrically isolated from the output of the power supply assembly.

14. A power supply assembly as in claim 13 wherein the controller of the power supply includes:
    a processor; and
    memory coupled to the processor, wherein the memory is configured to store an application, and wherein the processor is configured to reproduce communications of a backup power supply when executing the application.

15. A power supply assembly as in claim 13 wherein the controller, when providing simulated backup power supply responses, is configured to:

initially imitate a backup power supply being in a SELF TEST state, imitate the backup power supply being in a BATTERY CHARGING state after a self test time period has elapsed, and imitate the backup power supply being in a READY state after a battery charging time period has elapsed.

16. A power supply assembly as in claim 15 wherein the controller, when imitating the backup power supply being in the BATTERY CHARGING state, is configured to:

provide a simulated BATTERY CHARGING reply to the powerable device through the data communications channel, in response to a backup power supply CONDITION query from the powerable device through the data communications channel, the BATTERY CHARGING reply being a simulated backup power supply response indicating that the imitated backup power supply is in the BATTERY CHARGING state.

17. A power supply assembly as in claim 15 wherein the controller, when imitating the backup power supply being in the READY state, is configured to:

provide a simulated READY reply to the powerable device through the data communications channel, in response to a backup power supply CONDITION query from the powerable device through the data communications channel, the READY reply being a simulated backup power supply response indicating that the imitated backup power supply is in the READY state.

18. A power supply assembly as in claim 15 wherein the controller, when imitating the backup power supply being in the READY state, is configured to:

imitate the backup power supply transitioning into a BATTERY TEST state in response to a BATTERY TEST command from the powerable device through the data communications channel.

19. A power supply assembly as in claim 18 wherein the controller, when imitating the backup power supply being in the BATTERY TEST state, is configured to:

provide an ON BATTERY reply to the powerable device through the data communications channel, in response to a CONDITION query from the powerable device through the data communications channel, the ON BATTERY reply being a simulated backup power supply response indicating that the imitated backup power supply is in the BATTERY TEST state.

20. A power supply assembly as in claim 15 wherein the controller, when imitating the backup power supply being in the READY state, is configured to:

receive a STOP command from the powerable device through the data communications channel; and ignore the STOP command by continuing to provide power to the powerable device.

21. A power supply assembly as in claim 15 wherein the controller, when imitating the backup power supply being in an ON BATTERY state, is configured to:

power down and cease operation of the power supply in response to a STOP command from the powerable device through the data communications channel.

22. A power supply assembly as in claim 12 wherein the power supply assembly does not have a backup power supply.

\* \* \* \* \*